Patented Feb ... 2,461,522

UNITED STATES PATENT OFFICE 2,461,522

PACKAGED MEAT AND LIKE PRODUCTS AND PROCESS THEREOF

Mayne R. Coe, Washington, D. C., assignor to Rile-Coe Filter Process, Inc., Pinehurst, N. C., a corporation of Delaware No Drawing. Original application August 14, 1941, Serial No. 406,909. Divided and this application September 19, 1946, Serial No. 697,924

13 Claims. (Cl. 99—174)

This invention relates to the packaging of meat and like products of the genus fauna, such as hemoglobin meats and meat products, fish, eggs and the like, and provides a packaging material which acts as a color screen for shielding commodities that are affected by light.

The present application is a division of my prior U. S. application Serial No. 406,909, filed August 14, 1941, now Patent Number 2,418,818 issued on April 15, 1947.

More specifically, the invention provides a color screen which absorbs substantially all of the ultra violet, violet, and blue, as well as a substantial amount of light in the region delimited by 6300 to 6700 Angstrom units of the spectrum.

As disclosed in my original application, such a screen has been found very effective for enclosing and/or shielding commodities which are affected by light in the region below 4900 Angstrom units and in the region delimited by 6300–6700 Angstrom units, and is effective in the case of meats, fish and eggs, since they absorb copious amounts of light in the ultra violet, violet and blue region of the spectrum as well as absorb a certain amount of light in the red region of the spectrum.

I have found that certain products, other than those containing chlorophyll, absorb light practically in the same regions. This is true of meat and meat products containing blood or hemoglobin in varying amounts, and also substances containing vitamins, especially carotene (pro-vitamin "A") and vitamin "C," and substances containing enzymes, especially catalase, for example. These substances occur in nature and thus are susceptible to light. It has been found by experiment that when they are deprived of their living environment, they retain their natural characteristics and potency when shielded from light below 4900 Angstrom units and from light delimited by 6300 to 6700 Angstrom units of the spectrum.

I have found that those wave lengths of light which are most harmful to meat, fish and eggs containing vitamins, enzymes and/or porphyrins are those lying in the region below 4900 Angstrom units as well as those lying in the region of 6300 to 6700 Angstrom units, and that the other wave lengths of the spectrum are not deleterious or harmful to those said products. Therefore, it follows that when a color screen is interposed between the light source and said products or commodities to intercept and absorb said harmful and deleterious wave lengths of light, said products are improved, enhanced, protected, and their desired natural characteristics are controlled.

In the practice of this invention, there is provided a color screen as a shielding element for the commodities of the genus fauna, which comprise meat or meat products, fish, eggs and the like, which color screen may be of any suitable material which is translucent, as for example paper, or substantially transparent, as for example, transparent cellulose, but which is definitely absorbent of light having wave lengths below 4900 Angstrom units and absorbent of wave lengths lying in the region between 6300 to 6700 Angstrom units and therefore to which wave lengths of light the material is substantially opaque.

It will be understood, on the other hand, that an otherwise completely transparent material may be used which, however, has been combined, impregnated, and/or coated with a substance such as to make the material a color screen which is substantially absorbent of or opaque to light as delimited in the preceding sentence.

It is desired to be emphasized that the dyestuffs and/or coloring substances which may be utilized in producing such a color screen are not selected with regard for their visual color effect but rather for their light absorptive characteristics in the ultra violet, violet, and blue regions of the spectrum, and also in the region delimited by 6300 to 6700 Angstrom units. Further, and more specifically, they are, for example only, a suitable yellow combined with Malachite green, Monastrel green or Fast green A5832. The necessary concentration of the dyestuff is dictated by the purpose for which the sheet material is to be used.

The protective element of the present invention may be utilized in various forms, as protection shields, plates, caps, tubing, bands, wrapping blanks, bags and formed containers such as bottles, cartons, boxes, packs, including linings of bags.

The protective element is characterized by the property it has of preventing or delaying the photo-chemical action of light with respect to meats containing hemoglobin, porphyrins, and fish and eggs, all of which also may contain enzymes, vitamins, oils and/or fats that are deleteriously affected by wave lengths of light below 4900 Angstrom units as well as those between 6300–6700 Angstrom units of the spectrum.

The novel feature of the present invention, over other known art in this field, is pertinent and specific to the region of light absorptions below 4900 and the region delimited by 6300 to 6700 Angstrom units in combination with substantial transmission of all other light.

Vegetable oils contain the pigment, chlorophyll, which accounts for the spectral absorption by the oil of wave lengths of light below 4900 Angstrom units as well as in the region delimited by 6300 to 6700 Angstrom units. The color screen used in the present invention has the property of protecting the oil from deterioration through the development of rancidity, and is an improvement over that disclosed in the Coe Patent No. 1,880,813 in that a higher degree of transparency is obtained by this present invention, and there is provided a color screen which is more appealing to the eye from a sales point of view.

This same chlorophyll pigment is present in unripened fruits and vegetables, as well as in the stage of early flowering of plants, and also in rubber. Chlorophyll is the photosensitizer present in plant life which helps to induce photo-chemical action in the presence of light. Hemoglobin in meat and meat products has practically the same absorption characteristics as chlorophyll, probably due to the presence of porphyrin in both, and also acts as a photosensitizer when exposed to light. Vitamins and enzymes are in commodities containing the following photosensitizers, namely, porphyrins including chlorophyll and hemoglobin, as well as other photosensitizers, and therefore the characteristics and potency of vitamins and enzymes are more or less controlled by preventing such photosensitizers from functioning. Therefore, the present invention provides a color screen which has for its function the property of absorbing substantially the same light as is absorbed in nature by growing vegetation and by meat and meat products.

The well-known Grotthus-Draper law states that where there is light absorption there is usually photochemical action, which may and usually does result deleteriously in the case of harvested fruits, vegetables, and in meats et cetera. As a result of numerous experiments, I have discovered that each of Malachite green, Monastrel green, or Fast green A5832, with the addition of a suitable yellow dye or pigment, can be used to produce a color screen having a spectral absorption in the regions specified above.

The effectiveness of my color screen does not depend on the color as seen by the eye, but on the spectral properties of this screen as hereinabove stated. Suitable dyestuffs and coloring matter for use in this invention are those which absorb appreciably, or are substantially opaque to, the wave lengths of light in the ultra violet, violet, and blue regions and in the region delimited by 6300 to 6700 Angstrom units of the spectrum.

The dyestuff or coloring matter may be incorporated in the screen material either during or after the manufacture thereof. It is preferred that the dyestuff or the coloring matter or the light absorbing material be present in this protective element in such a concentration that the light transmission in the specified regions of absorption is not greater than 10% and preferably less than 5%, i. e. in the region below 4900 Angstrom units and is preferably less than 10% in the region delimited by 6300 to 6700 Angstrom units.

The color screen may comprise materials normally translucent or transparent to visible light; for example, glass, glassine, synthetic plastics, gelatin, casein, synthetic resins of various types, non-fibrous cellulosic materials such as regenerated cellulose and cellulose derivatives, as cellulose esters, cellulose ethers, and cellulose oxyethers; or composite materials containing two or more of the above mentioned substances, viz. impregnated and/or coated materials, such as lacquered glass or lacquered regenerated cellulose, as well as laminated products comprising laminated glass, paper, textiles (especially silk), and the like.

Although the above remarks have applied more especially to the case where the dyestuff is combined with, dyed or impregnated in the shielding element, the invention also contemplates employing a protective element which may be coated with a substance or material rendering the element substantially opaque to light below 4900 Angstrom units and also to light of the region of the visible spectrum delimited by 6300 to 6700 Angstrom units.

In carrying out my experiments since the issuance of my Patent No. 1,880,813, I have discovered that the products hereinbefore mentioned, as well as oils, fats and waxes, need not have excluded therefrom all light having wave lengths above 5600 Angstrom units and in fact beneficial results have been obtained by extending the region of transmission from 4900 upwards with the exception of a critical region substantially delimited by 6300 to 6700 Angstrom units. This region 6300 to 6700 has been proved to be critical in that it constitutes the substantial equivalent of nature's chlorophyll, and/or hemoglobin, and hence the resultant color screen should have a pigmentation or color which will absorb wave lengths of light lying in this critical region.

It is obvious that those skilled in the art may vary the details of construction as well as the arrangements of parts constituting the articles of this invention, as well as vary the steps and combinations of steps constituting the method covered by this invention, without departing from the spirit of this invention and therefore it is desired not to be limited to the exact foregoing disclosure except as may be required by the claims.

I claim:

1. An article of commerce comprising an edible food commodity of the genus fauna which normally would be deleteriously affected by the photo-chemical action resulting from the absorption thereby of wave lengths of light lying below 4900 Angstrom units as well as lying in the region of 6300–6700 Angstrom units, said commodity having an applied color screen having a spectral transmission of substantially all light in the region delimited by 4900–6300 Angstrom units as well as above 6700 Angstrom units, but excluding an appreciable portion of substantially all other light and particularly such other light having wave lengths from 6300–6700 Angstrom units of the spectrum.

2. An article of commerce comprising a meat product which normally would be deleteriously affected by the photo-chemical action resulting from the absorption thereby of wave lengths of light lying below 4900 Angstrom units as well as lying in the region of 6300–6700 Angstrom units, said meat product having an applied color screen having a spectral transmission of substantially all light in the region delimited by 4900–6300 Angstrom units as well as above 6700 Angstrom units, but excluding an appreciable portion of substantially all other light and particularly such other light having wave lengths from 6300–6700 Angstrom units of the spectrum.

3. An article of commerce comprising a fish product which normally would be deleteriously affected by the photo-chemical action resulting from the absorption thereby of wave lengths of light lying below 4900 Angstrom units as well as lying in the region of 6300–6700 Angstrom units, said fish product having an applied color screen having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

4. An article of commerce comprising eggs which normally would be deleteriously affected by the photo-chemical action resulting from the absorption thereby of wave lengths of light lying below 4900 Angstrom units as well as lying in the region of 6300-6700 Angstrom units, said eggs having an applied color screen having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

5. An article of commerce comprising an edible food commodity of the genus fauna which normally would be deleteriously affected by the photo-chemical action resulting from the absorption thereby of wave lengths of light lying below 4900 Angstrom units as well as lying in the region of 6300-6700 Angstrom units, said commodity having an applied protective enclosure having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

6. An article of commerce comprising a meat product which normally would be deleteriously affected by the photo-chemical action resulting from the absorption thereby of wave lengths of light lying below 4900 Angstrom units as well as lying in the region of 6300-6700 Angstrom units, said meat product having an applied protective enclosure having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

7. An article of commerce comprising a fish product which normally would be deleteriously affected by the photo-chemical action resulting from the absorption thereby of wave lengths of light lying below 4900 Angstrom units as well as lying in the region of 6300-6700 Angstrom units, said fish product having an applied protective enclosure having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

8. An article of commerce, comprising eggs which normally would be deleteriously affected by the photo-chemical action resulting from the absorption thereby of wave lengths of light lying below 4900 Angstrom units as well as lying in the region of 6300-6700 Angstrom units, said eggs having an applied protective enclosure having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

9. The process of inhibiting deleterious photochemical action in edible food commodities of the genus fauna which normally would result from the absorption thereby of certain wave lengths of light, which comprises shielding the commodity from rays of light with a material such as to admit to the commodity those wave lengths of light between approximately 4900 and 6300 as well as above approximately 6700 Angstrom units, while excluding wave lengths of light in all other regions.

10. The process of inhibiting deleterious photochemical action in meat products which normally would result from the absorption thereby of certain wave lengths of light, which comprises shielding the commodity from rays of light with a material such as to admit to the meat product wave lengths of light between approximately 4900 and 6300 as well as above approximately 6700 Angstrom units, while excluding wave lengths of light in all other regions.

11. The process of inhibiting deleterious photochemical action in a fish product which normally would result from the absorption thereby of certain wave lengths of light, which comprises shielding the commodity from rays of light with a material such as to admit to the fish product those wave lengths of light between approximately 4900 and 6300 as well as above approximately 6700 Angstrom units, while excluding wave lengths of light in all other regions.

12. The process of inhibiting deleterious photochemical action in eggs which normally would result from the absorption thereby of certain wave lengths of light, which comprises shielding the commodity from rays of light with a material such as to admit to the eggs those wave lengths of light between approximately 4900 and 6300 as well as above approximately 6700 Angstrom units, while excluding wave lengths of light in all other regions.

13. An article of commerce comprising a meat product containing hemoglobin which normally would be deleteriously affected by the photo-chemical action resulting from the absorption thereby of wave lengths of light lying below 4900 Angstrom units as well as lying in the region of 6300-6700 Angstrom units, said meat product having an applied protective enclosure having a spectral transmission of substantially all light in the region delimited by 4900-6300 Angstrom units as well as above 6700 Angstrom units, but excluding an appreciable portion of substantially all other light and particularly such other light having wave lengths from 6300-6700 Angstrom units of the spectrum.

MAYNE R. COE.

REFERENCES CITED

The following references are of record in the file of this patent:

UNITED STATES PATENTS

| Number | Name | Date |
|---|---|---|
| 2,108,305 | Coe | Feb. 15, 1938 |
| 2,158,610 | Coe | May 16, 1939 |

OTHER REFERENCES

"Food," August 1936, pages 423 and 424, article entitled "The Wrapping of Food."